350-444

SR
XR  3,974,376

United States
van der Sande

[11] 3,974,376
[45] Aug. 10, 1976

[54] LIGHT AMPLIFIER FOR OBTAINING INTENSIFIED LIGHT IMAGE FROM PHOTOEMISSIVE SURFACE

[75] Inventor: Jan J. van der Sande, Manhasset, N.Y.

[73] Assignee: Astrophysics Research Corporation, Harbor City, Calif.

[22] Filed: Nov. 22, 1966

[21] Appl. No.: 596,349

[52] U.S. Cl............................. 250/213 VT; 313/94
[51] Int. Cl.² ..................... H01J 31/50; H01J 39/00
[58] Field of Search.................. 250/213 R, 213 VT; 313/65, 94; 350/201, 200

[56] References Cited
UNITED STATES PATENTS

| | | | |
|---|---|---|---|
| 2,663,814 | 12/1953 | Teves et al........................ | 250/213 |
| 2,683,816 | 7/1954 | Bouwers ........................... | 250/213 |

*Primary Examiner*—Maynard R. Wilbur
*Assistant Examiner*—S. C. Buczinski
*Attorney, Agent, or Firm*—Edward A. Sokolski

[57] ABSTRACT

This disclosure concerns a light amplification apparatus for focusing a light image of an object being viewed by the apparatus on a photoemissive surface which then emits a pattern of electrons directed at a fluorescent screen. An intensified light image of the object is produced on the screen by the electrons emitted from the photoemissive surface. The photoemissive surface faces in a direction away from the object being viewed and is concave for receiving light rays from the object being viewed which have been directed thereon by a lens-mirror having a rear concave mirror surface facing the concave photoemissive surface and a front convex surface. Thus, the light rays entering and leaving the lens-mirror are refracted in such a way as to produce a sharply focused image on the photoemissive surface.

11 Claims, 3 Drawing Figures

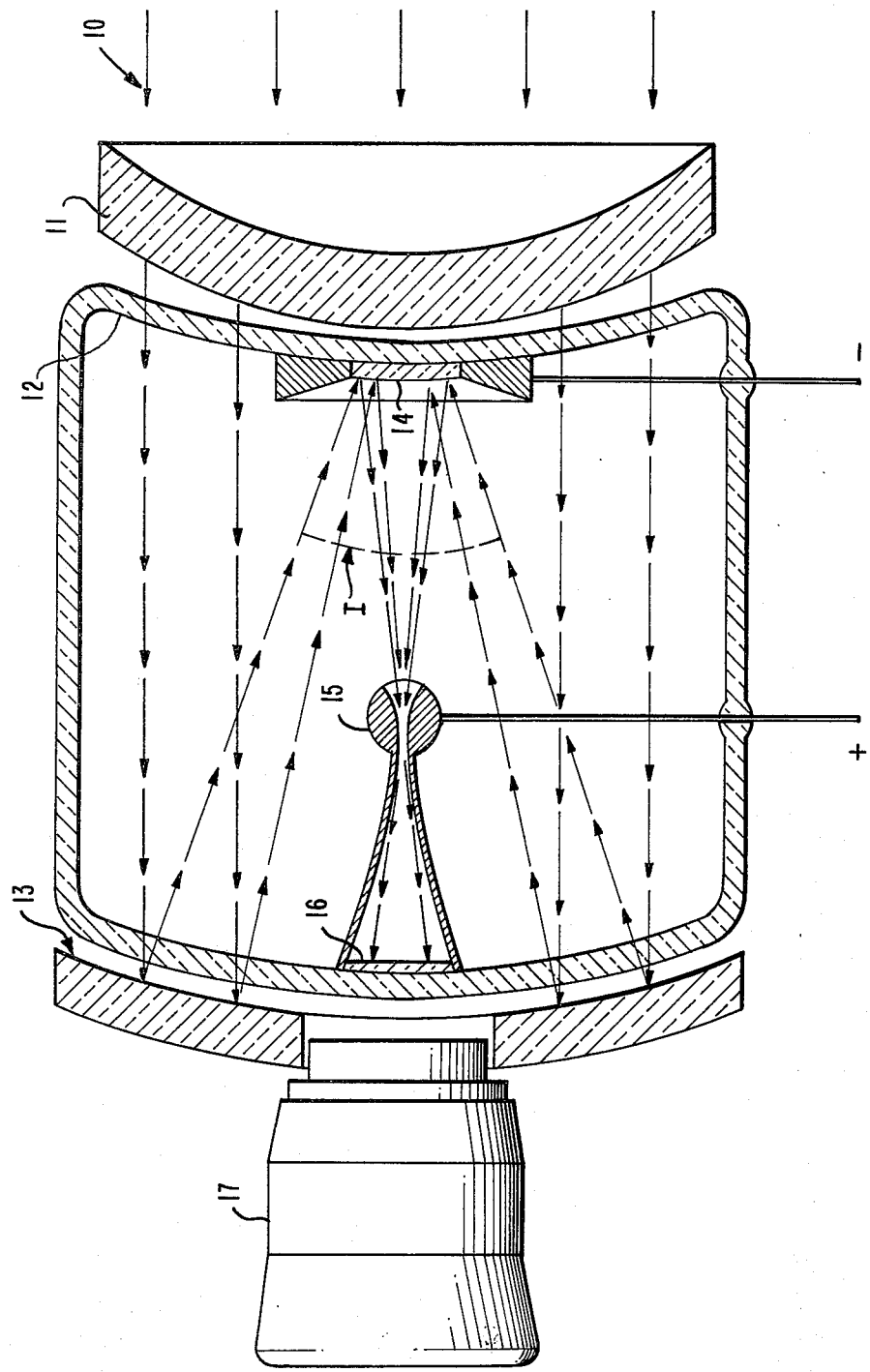
FIG.—1 PRIOR ART
JAN J. VAN DER SANDE
INVENTOR.
BY Edward O. Ansell
George J. Netter
ATTORNEYS FIG.—2
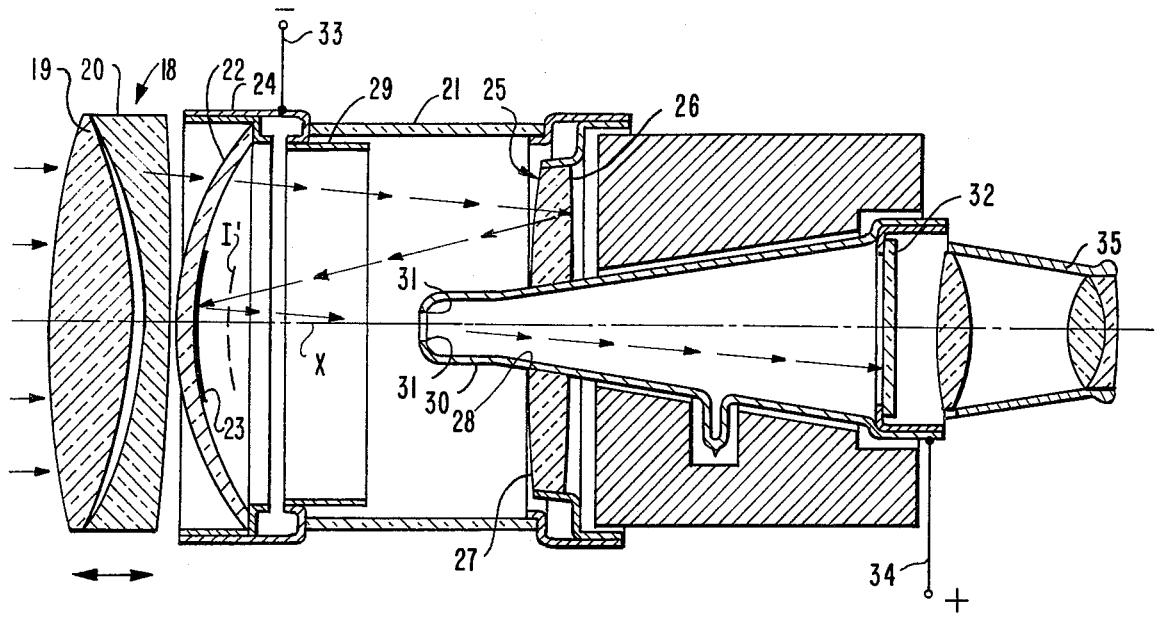
FIG.—3
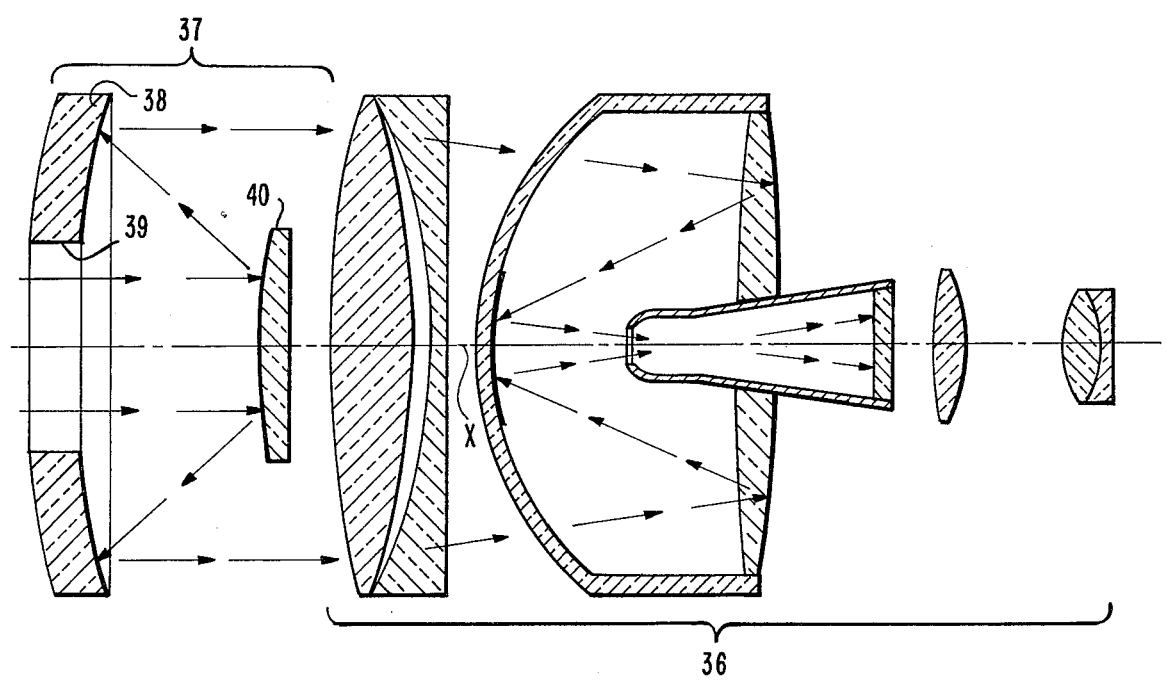
JAN J. VAN DER SANDE
INVENTOR.
BY Edward O. Ansell
George J. Netter
ATTORNEYS

LIGHT AMPLIFIER FOR OBTAINING INTENSIFIED LIGHT IMAGE FROM PHOTOEMISSIVE SURFACE

The present invention relates generally to light amplification apparatus, and, more particularly, to such apparatus for providing a high-quality image of increased intensity over that of the received light energy.

In one class of light amplification apparatus, or image intensifiers, a light image is brought to focus on a photoelectron emissive surface. A pattern of electrons corresponding to the light image is emitted from this surface and caused to impinge upon a fluorescent screen providing the desired intensified image. Exemplary of a device of this general character is the Schmidt Light Amplifier set forth in U.S. Pat. No. 2,683,816 to A. Bouwers.

In known prior devices, certain problems and disadvantages arose in making an overall compact construction that would not sacrifice either image quality or degree of intensification obtainable. In particular, for reasons which will be elaborated on later, it was considered necessary in those devices to construct the photoemissive surface, as well as certain optical elements, in such manner and so related as to provide an intensified image somewhat lacking in sharpness.

Also, the prior devices customarily had a relatively small field of view (e.g., approximately 15°) which limited their applicability. For example, there are many situations where such devices would be highly advantageous for operation in a search mode, but such use necessitates a field of view more in the range of 40–50° for optical effectivity.

It is, therefore, a primary purpose and aim of the present invention to provide light amplification apparatus of compact construction for enhancing light intensity.

A further object of the invention is the provision of light amplification apparatus having a selectably extendable field of view.

Another object is the provision of a light amplifier offering an image for direct viewing of exceptional sharpness.

A still further object is the provision of light amplification apparatus that can be manufactured relatively simply and inexpensively, and amenable to high volume machine production techniques.

IN THE DRAWINGS

FIG. 1 is a longitudinal sectional view of one class of known light amplifier illustrative of general principles of operation.

FIG. 2 is a longitudinal sectional view of one form of the invention.

FIG. 3 is a longitudinal sectional view of another form of the invention offering an enhanced field of view.

With reference now particularly to FIG. 1, parallel light rays 10 from an object pass through a correcting lens 11, and transparent enclosure walls 12, to impinge upon the reflective surface of a concave mirror 13. The reflected rays then impinge upon a photoemissive surface 14 that presents a generally convex surface toward an accelerating and focusing electrode 15. The light image formed on the photoemissive surface 14 causes a corresponding image pattern of electrons to be released that are accelerated and focused by an electrostatic field (indicated by the + and − signs) along a path through the electrode 15 and onto a fluorescent screen 16. As the electrons strike the screen initiating fluorescence, a visible intensified image is created corresponding to the original viewed object. An optical eyepiece 17 provides magnified viewing of the image on the screen 16.

The structural features described to this point relate to known devices, the overall operational principles of which are sufficiently well-known to those skilled in the light amplification art as not to require more detailed presentation. If further information is desired on basic theoretical aspects of light intensification or amplification, reference can be made to the previously mentioned U.S. Pat. No. 2,683,816 issued to Bouwers.

It can be shown that the combined optical effect of correcting lens 11 and concave mirror 13 on incoming light rays is to produce a focal plane (image) that is generally convex towards the light rays coming into the plane. This is illustrated by the photoemissive surface 14. However, from the electron-optics standpoint, it is requisite that the photoemissive surface be concave toward the electrode 15 in order to focus the emitted electrons on to the screen 16. This conflict in electron-optics requirement and actual optical conditions of the device of FIG. 1 results in an image on the screen that cannot be completely brought into focus. That is, if initially the center of the image is brought into focus, a progressively increasing out-of-focus condition is encountered on moving toward the outer edges of the image. Thus, it is an important advantage and improvement of the present invention to overcome this image clarity problem and provide, instead, an image presentation of overall, uniformly sharply defined character.

Turning now to FIG. 2, incoming light rays (arrows), from an object being examined by the device of this invention, first meet an objective lens assembly 18.

Although other lens arrangements can be used for this purpose, excellent results have been obtained with a non-cemented doublet including a convexo-convex lens 19 and a concavo-convex lens 20. As shown, this assembly is separately adjustable relative to the rest of the device along a direction parallel to the optical axis-X for the purpose of bringing objects being viewed into proper focus. This is the only adjustment required of an operator.

The central portion of the device includes a sealed, highly evacuated chamber 21. The forward part of the chamber has a curved transparent window lens 22, with a convex surface facing the objective lens assembly 18 and an internally directed concave surface of substantially identical radius of curvature. On the inner concave surface, there is provided a relatively thin layer 23 of photoemissive material disposed symmetrically about the optical axis-X. For reasons which will be elaborated on later, the layer 23 is of concave geometry facing in a direction away from the object being viewed. Cylindrical side walls 24 are sealingly related to the window lens 22 and extend longitudinally of and in axial alignment with the optical axis-X.

In spaced, directly opposed relation to the window and sealingly engaged with the sidewalls 24, is a special lens-mirror 25. The lens-mirror comprises a rear surface mirror 26 with a spherically concave reflecting surface facing forwardly, toward the window lens 22. The front surface 27 of the lens-mirror is formed into a convex surface as viewed from the window side. An opening 28 is formed at the center of the lens-mirror passing completely therethrough.

A first electrode 29 of generally cylindrical shape is disposed inwardly of the sidewalls 24 and adjacent the window lens carrying the layer 23. A second electrode 30 of hollow conical construction has its small end received within the opening 28 and facing the window 22. The small end of the second electrode has a restricted orifice 31 formed therein, whereas the large end of the electrode is closed by a screen 32 coated with a suitable fluorescent material. Leads 33 and 34 connect the first and second electrodes, respectively, to an external source of electric voltage (not shown) for establishing an accelerating and focusing electric field for the photoelectrons emitted from the layer 23.

Incoming light rays from an object being viewed are focused by the objective lens assembly 18 through the window 22 onto the back surface mirror 26, reflected back through the lens-mirror onto the layer 23. Now, however, in contradistinction to the prior art device previously described, the focal plane at the layer 23 is not convex towards the incoming light rays, but rather concave in that direction as depicted by the surface carrying layer 23. This result is achieved primarily by the lens action of the lens-mirror 25, i.e., refraction of the light rays upon entering and leaving the convex front surface 27. This concavity of image plane, as has been previously noted, has the desired effect of enabling the entire image to be simultaneously sharply focused on the photoemissive layer 23, which focusing is simply accomplished by appropriate adjustment of the objective lens assembly along the optical axis-X.

The accurately focused light image on the photoemissive layer is converted to a pattern of emitted electrons. The electric field set up between the electrodes 33 and 34, causes a focused movement of the emitted electrons into the restricted orifice 31 and through the second electrode for subsequent impingement upon the fluorescent screen 32. There is now a visible intensified image of the original object on the fluorescent screen which is viewed via a conventional eyepiece 35.

The form of the invention set forth in FIG. 3 is seen to comprise a light amplifier assembly 36 that is substantially identical in construction to that of FIG. 2, and a special afocal system 37 located forwardly of the amplifier assembly. The afocal system consists of an annular front surface mirror 38 of spherical concavity with centrally located opening 39, and a circular convex front surface mirror 40. The annular mirror is axially aligned and normal to the optical axis-X of the amplifier assembly with the mirror parts facing the assembly. The convex mirror 40 is similarly axially aligned with and normal to the optical axis, and located between the annular mirror and the amplifier assembly with the mirror surface facing the object being viewed.

In operation, parallel light rays (arrows) pass through the central opening 39 in the annular mirror and on to the convex mirror 40. Reflection from the mirror 40 passes the rays to the reflective surface of the annular mirror from which the rays come off in parallelism once again. The optical effect achieved by the afocal system is that of increasing the field of view. Subsequent processing of the light rays for intensification by the assembly 36 is identical to that described herein in connection with the FIG. 2 embodiment.

While a particular embodiments of the invention have been illustrated and described, it will be understood that the invention should not be construed as being limited thereto, but only to the lawful scope of the appended claims.

I claim:
1. In light amplification apparatus having an evacuated chamber with at least one light transmissive wall portion, a photoemissive member within the chamber, reflecting means for receiving light from an externally located object passing through the wall portion and reflecting it onto the photoemissive member, and means for focusing the photoemitted electrons from the photoemissive member and providing a visible representation of the object, the improvement comprising that said reflecting means includes a lens-mirror body, said body having a concave rear surface reflecting coating with the concavity facing generally toward the photoemissive member, and said body further having a front surface formed convexly toward the photoemissive member through which the reflected light passes.

2. Light amplification apparatus as in claim 1, in which the lens-mirror body forms another wall portion of the evacuated chamber with the convex front surface thereof being within the chamber.

3. Light amplification apparatus as in claim 1, in which the photoemissive member is concavely shaped towards the reflecting means whereby the focal plane of the object reflected onto the photoemissive member is of similar curvature to that of the photoemissive member.

4. Light amplification apparatus as in claim 1, in which the means for focusing and providing a visible representation includes a generally elongate hollow electrode disposed within an opening in the lens-mirror body and having an open end within the chamber and the other end lying outwardly thereof, and a fluorescent screen closing the other end of the hollow electrode on which the photoemitted electrons from the photoemissive member are received for providing the visible representation of the object thereon.

5. Light amplification apparatus as in claim 4, in which the means for focusing and providing a visible representation further includes a generally cylindrical electrode located within the chamber adjacent the photoemissive member.

6. Light amplification apparatus as in claim 1, in which there is further provided outwardly of the evacuated chamber and adjacent the light transmissive wall portion an adjustably positionable objective lens assembly for receiving light from the object being viewed and focusing the same such that after reflection it is in proper focus on the photoemissive member.

7. Light amplification apparatus as in claim 6, in which the objective lens assembly includes a noncemented doublet of a convexo-convex lens and a concavo-convex lens, the latter lens being the one closer to the light transmissive wall portion.

8. Light amplification apparatus as in claim 1, in which there is further provided an afocal lens system outwardly of the evacuated chamber and opposite the light transmissive wall portion for receiving light from the object and increasing the field of view thereof.

9. Light amplification apparatus as in claim 8, in which the afocal lens system includes a generally annularly shaped mirror body having a concave front reflecting surface facing the light transmissive wall portion; and a convex front surface mirror fixedly mounted between the annularly shaped mirror body and the light transmissive wall portion such that light from the object being viewed reflects off the convex front surface mirror onto the concave front reflecting surface of the annular mirror body and thence through the light transmissive wall portion.

10. Light amplification apparatus as in claim 1, in which the photoemissive member is deposited on the inner surface of the light transmissive wall portion of the evacuated chamber.

11. In light amplification apparatus having an evacuated chamber with at least one light transmissive wall portion, a photoemissive member within the chamber, reflecting means for receiving light from an externally located object passing through the wall portion and reflecting it onto the photoemissive member, and means for focusing the photoemitted electrons from the photoemissive member and providing a visible representation of the object, the improvement comprising that said reflecting means includes a lens-mirror body, said body having a concave rear mirror surface and said body further having a front surface formed convexly toward the photoemissive member through which the reflected light passes.

\* \* \* \* \*